United States Patent
Kanazawa et al.

(10) Patent No.: US 11,321,425 B2
(45) Date of Patent: May 3, 2022

(54) METHOD AND DEVICE FOR PROCESSING DATA

(71) Applicant: SHIMADZU CORPORATION, Kyoto (JP)

(72) Inventors: Shinji Kanazawa, Kyoto (JP); Hiroaki Kozawa, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 555 days.

(21) Appl. No.: 16/096,329

(22) PCT Filed: Apr. 27, 2016

(86) PCT No.: PCT/JP2016/063155
§ 371 (c)(1),
(2) Date: Oct. 25, 2018

(87) PCT Pub. No.: WO2017/187547
PCT Pub. Date: Nov. 2, 2017

(65) Prior Publication Data
US 2019/0129917 A1  May 2, 2019

(51) Int. Cl.
*G06F 17/18* (2006.01)
*G01N 30/86* (2006.01)
*G01N 30/72* (2006.01)

(52) U.S. Cl.
CPC .............. *G06F 17/18* (2013.01); *G01N 30/72* (2013.01); *G01N 30/8631* (2013.01); *G01N 30/8641* (2013.01)

(58) Field of Classification Search
CPC .... G06F 17/18; G01N 30/86; G01N 30/8624; G01N 30/8631; G01N 30/8641; G01N 30/8637

(Continued)

(56) References Cited

U.S. PATENT DOCUMENTS 4,674,058 A * 6/1987 Lindbloom .............. G09G 3/10
                                                    345/441
6,076,047 A * 6/2000 Ito ........................... G06F 17/10
                                                    702/30

(Continued)

FOREIGN PATENT DOCUMENTS

EP       2256481 A2 * 12/2010 ........... G01N 21/274
JP       04119477 A  *  4/1992 ............. H01J 11/12

(Continued)

OTHER PUBLICATIONS

Written Opinion dated Jun. 21, 2016 in application No. PCT/JP2016/063155.

(Continued)

*Primary Examiner* — Michael P Nghiem
(74) *Attorney, Agent, or Firm* — Sughrue Mion, PLLC

(57) ABSTRACT

A first reference line that is a regression line obtained from data within a predetermined range including a starting point of a peak detected from data of a graph showing changes in intensity with respect to a parameter, a second reference line that is a regression line obtained from data within a predetermined range including a ending point of the peak, and a third reference line connecting the starting and ending points, and one or more intermediate control points in a triangle defined by the first, second, and third reference lines are determined; and a Bezier curve between the starting point and the ending point is created to be determined to be a baseline of the peak, the Bezier curve being determined by control points of the starting point, the one or more intermediate control points, and the ending point in order on a parameter axis.

4 Claims, 6 Drawing Sheets

(58) Field of Classification Search
USPC .......................................................... 702/179
See application file for complete search history.

(56) References Cited

U.S. PATENT DOCUMENTS

2010/0039916 A1* 2/2010 Hasegawa .......... G06K 15/1228
369/100
2010/0305893 A1* 12/2010 Soejima ................ G01N 21/35
702/67

FOREIGN PATENT DOCUMENTS

JP          07-098270 A      4/1995
JP       2015-049136 A      3/2015

OTHER PUBLICATIONS

International Search Report of PCT/JP2016/063155 dated Jun. 21, 2016.

* cited by examiner

METHOD AND DEVICE FOR PROCESSING DATA

CROSS REFERENCE TO RELATED APPLICATIONS

This application is a National Stage of International Application No. PCT/JP2016/063155 filed Apr. 27, 2016.

TECHNICAL FIELD

The present invention relates to a method and a device for processing data of a graph showing changes in intensity with respect to a parameter, such as a chromatogram obtained by a chromatograph and a spectrum obtained by a mass spectrometer, a spectrometer, or the like.

BACKGROUND ART

An example of devices for analyzing components contained in a sample includes a chromatograph. In the chromatograph, a sample is introduced into a mobile phase stream and then carried into a column. Components in the sample is temporally separated in the column, and then detected by a detector to create a chromatogram. Subsequently, each of the components is identified based on their peak positions on the chromatogram, and the concentration of the component is determined from the corresponding peak height or area (for example, Patent Literature 1).

In the chromatogram, a peak or peaks resulting from the sample lies over a baseline that exists with or without the peak or peaks. To obtain accurate information of the sample from the chromatogram, it is necessary to determine the peak or peaks after removing the baseline. An example of a method of removing the baseline from a chromatogram will be described below with reference to FIG. 9A-9C.

First, a peak top 91 is detected from a chromatogram (FIG. 9A). The peak top 91 is determined, for example, at a position where it has a height not less than a predetermined value on the chromatogram and a primary differential value of zero. Alternatively, an operator may visually determine the peak top 91 and then designate the position 91 with an input device such as a mouse. Subsequently, a starting point 92 of the peak is detected in the retention time range before the peak top 91, and an ending point 93 of the peak is detected in the retention time range after the peak top 91 (FIG. 9A). The starting point 92 is determined, for example, at a position where it has a positive secondary differential value and a primary differential value of not less than a positive predetermined value, or is visually determined and designated with an input device by the operator. Similarly, the ending point 93 is determined at a position where it has a positive secondary differential value and a primary differential value of not more than a negative predetermined value (that is, the absolute value being not less than a predetermined value), or is visually determined and designated with an input device by the operator.

A baseline is determined from the starting point 92 and the ending point 93 of the peak thus determined, for example, as follows. First, in a chromatogram over retention time range with no peak, such as retention time range between peaks or of either end of the whole chromatogram, the chromatogram itself serves as a partial baseline 941 (FIG. 9B). In each of peak sections, a straight line connecting the starting point 92 and the ending point 93 serves as a partial baseline 942 (FIG. 9B). The partial baselines 941 and 942 thus obtained are connected to obtain an entire baseline 94 of the chromatogram. By subtracting this baseline 94 from the chromatogram, the peak of the chromatogram corresponding to a component of the sample is determined (FIG. 9C), and then the feature quantities for the determined peak, such as its position, width, and height, are obtained.

CITATION LIST

Patent Literature

Patent Literature 1: JP H07-098270 A
Patent Literature 2: JP 2015-049136 A

SUMMARY OF INVENTION

Technical Problem

In the method described above, the baseline 94 is a curve (the chromatogram itself) in the range where there is no peak of the chromatogram, while the baseline 94 is a straight line in the range where there is a peak of the chromatogram between the starting point 92 and the ending point 93. Accordingly, the connections at the front and back of the starting point 92 and the ending point 93 of the baseline 94 are unnatural. Therefore, the whole chromatogram in which the baseline 94 is subtracted also shows an unsmooth connection at the front and back of the starting point 92 and the ending point 93.

The explanation above was made on a chromatogram, but the same problem also arises in a mass spectrum obtained by a mass spectrometer that is used in combination with a chromatograph, or in an optical spectrum obtained by a spectrometer and the like.

A problem to be solved by the present invention is to provide a method and a device for processing data by which a baseline can be determined to provide a smooth connection at and around the starting point and the ending point of a peak.

Solution to Problem

A data processing method according to the present invention developed for solving the previously described problem includes: detecting a starting point and an ending point of a peak from data of a graph showing changes in intensity with respect to a parameter; determining a first reference line that is a regression line obtained from data within a predetermined range including the starting point, a second reference line that is a regression line obtained from data within a predetermined range including the ending point, a third reference line that is a straight line connecting the starting point and the ending point, and one or more intermediate control points in a triangle defined by the first reference line, the second reference line and the third reference line; and creating a Bezier curve between the starting point and the ending point to determine the Bezier curve to be a baseline of the peak, the Bezier curve being defined by control points of the starting point, the one or more intermediate control points, and the ending point in order on a parameter axis.

Here, the parameter refers to, for example, a time in the case of chromatographs, a wavelength in the case of optical spectra, a mass-to-charge ratio in the case of mass-to-charge ratio spectra, and typically in a graph, the parameter is plotted on the horizontal axis and the intensity is plotted on the vertical axis. Hereinafter, in each graph, the parameter axis is sometimes referred to as the horizontal axis, and the intensity axis as the vertical axis.

A Bezier curve is normally defined by specifying three or more control points including a starting point and an ending point, and is a curve having tangents with the same gradient as a straight line connecting the starting point and its adjacent control point and a straight line connecting the ending point and its adjacent control point. In the present invention, the starting point and the ending point of a peak in a chromatogram or a spectrum are used as the starting point and the ending point of the control points of a Bezier curve, and the Bezier curve, which is created using three or more control points including the starting point, one or more intermediate control points, and the ending point in order on a parameter axis, is determined to be a baseline of the peak (a graph between the starting point and the ending point). Thus, the baseline of the peak has gradients close to the gradient of baselines outside the peak at the starting point and the ending point, and accordingly, the baseline provides a smooth connection at and around the starting point and the ending point of the peak.

Since the intermediate control points are all in the triangle, the gradient of a line segment connecting the starting point and the adjacent control point is equal to or less than the gradient of the first reference line. Thus, the gradient of the tangent at the starting point of the created Bezier curve is equal to or smaller than the gradient of the first reference line. The same applies to the ending point.

The number of the intermediate control points may be one or more. An example of a single intermediate control point includes a case where an intersection of the first reference line and the second reference line is determined to be the intermediate control point. According to this intermediate control point, since the resulting Bezier curve has the same gradient as the regression line described above, the baseline provides a smoother connection at each of the starting point and the ending point.

Alternatively, a point that is different from the intersection of the first reference line and the second reference line and has the same value of the parameter as the intersection (i.e., between the intersection and the third reference line) may be determined to be the intermediate control point. This method is beneficial when the gradient of the regression line obtained at the starting point or the ending point is too high.

Since normally the first reference line and the second reference line have gradients opposite to each other, the position of the intersection of the first reference line and the second reference line along the parameter axis (horizontal axis) is between the starting point and the ending point. However, if there is another peak or large drift near the peak to be processed, the first reference line and the second reference line may have gradients of the same direction. In that case, the position of the intersection of the first reference line and the second reference line along the horizontal axis is out of the range between the starting point and the ending point. It is not appropriate to use such an intersection as a control point of the Bezier curve to determine the baseline for the peak. Accordingly, in such a case, it is preferable to first determine two intermediate control points as follows: a first intermediate control point is a point on the first reference line and whose position along the horizontal axis is on the ending point side when viewed from the starting point (i.e. between the starting point and the ending point); and a second intermediate control point is a point on the second reference line and whose position along the horizontal axis is between the first intermediate control point and the ending point. Then the starting point, the first intermediate control point, the second intermediate control point, and the ending point are used as control points to create the Bezier curve. When the gradients of the first reference line and the second reference line are both positive, the first intermediate control point is in the triangle, while the second intermediate control point is outside the triangle. When the gradients of the first reference line and the second reference lines are both negative, the second intermediate control point is in the triangle, while the first intermediate control point is outside the triangle. Therefore, in this example, the one or more intermediate control points (i.e., control points other than the starting point and the ending point and in the triangle) mean a single point.

An example of two intermediate control points in the triangle (four control points including the starting point and the ending point) includes a case where a first intermediate control point is determined on the first reference line between the starting point and the intersection, and a second intermediate control point is determined on the second reference line between the intersection and the ending point. Since, in each of the starting point and the ending point, the resulting Bezier curve has the same gradient as the regression line described above, the baseline provides a smoother connection. Alternatively, a point between the starting point and the intersection and between the first reference line and the third reference line may be determined to be the first intermediate control point, and a point between the intersection and the ending point and between the second reference line and the third reference line may be determined to be the second intermediate control point. In both cases, the first intermediate control point is determined to be the adjacent control point of the starting point, and the second intermediate control point is determined to be the adjacent control point of the ending point, to create the Bezier curve.

Furthermore, by determining one or more intermediate control points between the first intermediate control point and the second intermediate control point, three or more intermediate control points (five or more control points including the starting point and the ending point) may be used to create the Bezier curve.

A data processing device according to the present invention includes a peak detector for detecting a starting point and an ending point of a peak from data of a graph showing changes in intensity with respect to a parameter;

an intermediate control point determiner for determining a first reference line that is a regression line obtained from data within a predetermined range including the starting point, a second reference line that is a regression line obtained from data within a predetermined range including the ending point, a third reference line that is a straight line connecting the starting point and the ending point, and one or more intermediate control points in a triangle defined by the first reference line, the second reference line and the third reference line; and a baseline determiner for creating a Bezier curve between the starting point and the ending point to determine the Bezier curve to be a baseline of the peak, the Bezier curve being determined by control points of the starting point, the one or more intermediate control points, and the ending point in order on a parameter axis.

Advantages Effects of Invention

The present invention makes it possible to determine a baseline to provide a smooth connection at the front and back of the starting point and the ending point of a peak.

DESCRIPTION OF EMBODIMENTS

Figure 1:
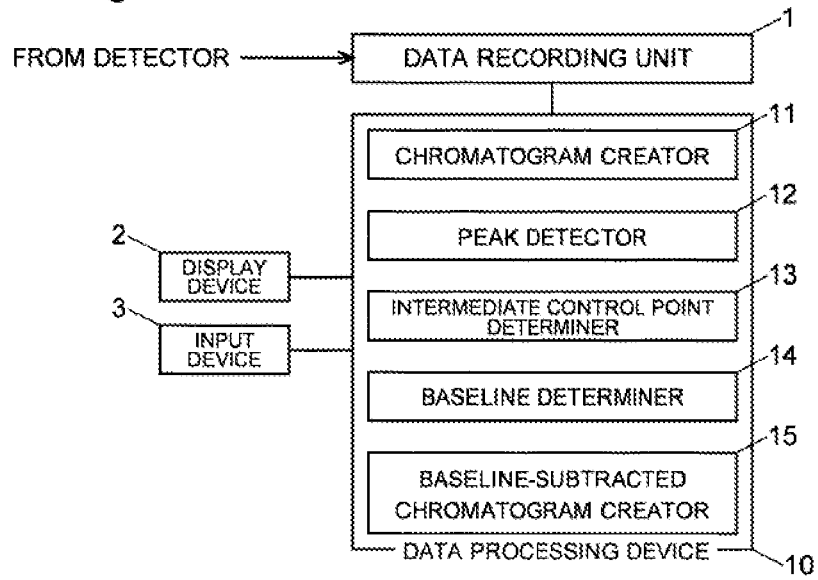
FIG. 1 is a schematic configuration diagram showing one embodiment of a data processing device according to the present invention.
Figure 2:
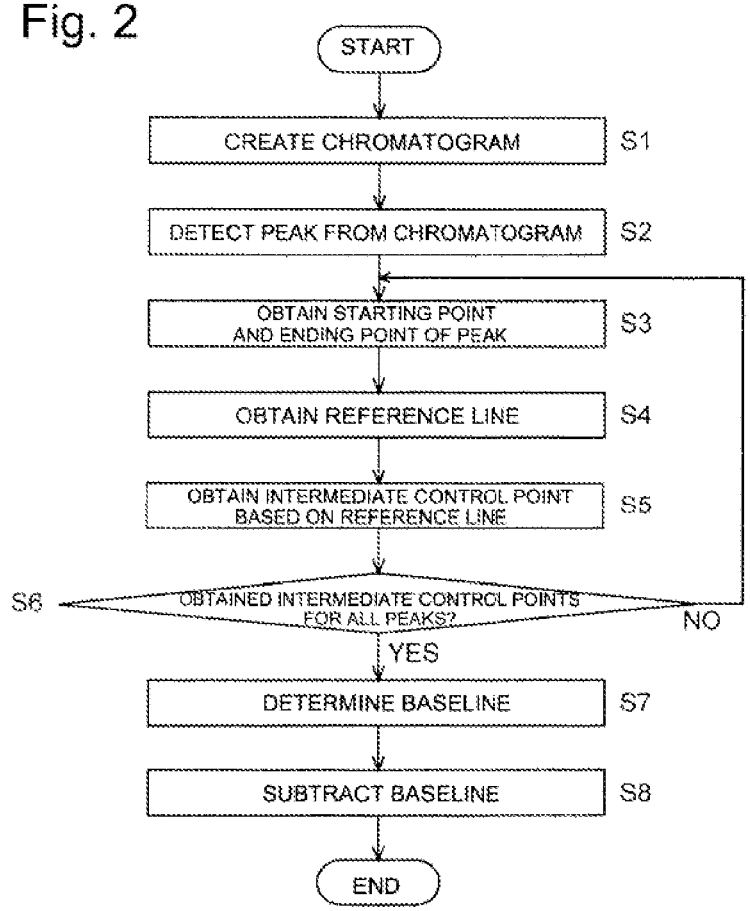
FIG. 2 is a flowchart showing a basic operation in a data processing method according to the present invention.

Embodiments of a method and a device for processing data according to the present invention will be described with reference to FIG. 1 to FIG. 8.

A data processing device 10 of the present embodiment is used together with a data recording unit 1, a display device 2, and an input device 3. The data recording unit 1 is a device for recording data obtained during measurement by a detector included in a liquid chromatograph, a gas chromatograph, or the like, and is composed of a hard disk, a memory, and the like. In an example shown in FIG. 1, the data recording unit 1 is provided outside the data processing device 10, but may be provided in the data processing device 10. The display device 2 is a display for displaying results of information and data processing during data processing by the data processing device 10. The input device 3 is a device for allowing a user to input necessary information to the data processing device 10, and is composed of a keyboard, a mouse, and the like.

The data processing device 10 includes a chromatogram creator 11, a peak detector 12, an intermediate control point determiner 13, a baseline determiner 14, and a baseline-subtracted chromatogram creator 15. These components are actually implemented by hardware, such as a CPU and a memory of a computer, and software. Hereinafter, with reference to a flowchart in FIG. 2 and schematic diagrams of a peak of a chromatogram in FIG. 3 and FIG. 4, one embodiment of a data processing method according to the present invention will be described, and functions of each component of the data processing device 10 will be also described.

First, the chromatogram creator 11 obtains data from the data recording unit 1, and creates a chromatogram in a conventional manner (step S1). In a case where a spectrum is processed, operations to create a chromatogram are unnecessary, and it is only necessary to obtain data from the data recording unit 1.

Next, the peak detector 12 detects a peak from the chromatogram created by the chromatogram creator 11 (step S2). The detection of the peak may be performed in a conventional manner (for example, see Patent Literature 2).

Subsequently, the intermediate control point determiner 13 determines, among control points of a Bezier curve used to determine a baseline for the section of the peak detected by the peak detector 12, an intermediate control point other than a starting point and an ending point, as follows (see FIG. 3).

First, a starting point 211 and an ending point 212 are obtained from a peak 21 detected by the peak detector 12 (step S3).

Next, a first reference line 231 that is a regression line obtained from data within a first range 221 that is a predetermined range including the starting point 211, and a second reference line 232 that is a regression line obtained from data within a second range 222 that is a predetermined range including the ending point 212 are obtained (step S4). In an example of a chromatogram 20 shown in FIG. 3, the first range 221 is set as a range outside the peak 21 from the starting point 211, and the second range 222 is set as a range outside the peak 21 from the ending point 212, respectively. However, each of the ranges may be set across outside and inside the peak 21 with including the starting point 211 or the ending point 212, or may be set inside the peak 21.

Then, the intersection of the first reference line 231 and the second reference line 232 is determined to be an intermediate control point 213 (step S5). In the example of FIG. 3, the intermediate control point 213 is the intersection of the first reference line 231 and the second reference line 232, but an intermediate control point has only to be within a triangle defined by the first reference line 231, the second reference line 232, and a third reference line 233 that is a straight line connecting the starting point 211 and the ending point 212. In an example of a chromatogram 20A shown in FIG. 4, a perpendicular 26 is drawn from an intersection 25 of a first reference line 231A obtained from a starting point 211A of a peak 21A and a second reference line 232A obtained from an ending point 212A down to a parameter axis (the horizontal axis of retention time in the chromatogram), and a point on the perpendicular 26 is obtained as an intermediate control point 213A.

If the chromatogram has a plurality of peaks, the operations in steps S3 to S5 described above are also performed on the other peaks. Accordingly, in step S6, it is checked whether the determination of the intermediate control points for all the peaks detected in step S2 is completed, and if it is YES (completed), then the process proceeds to step S7; if it is NO, then the process returns to step S3.

Figure 3:
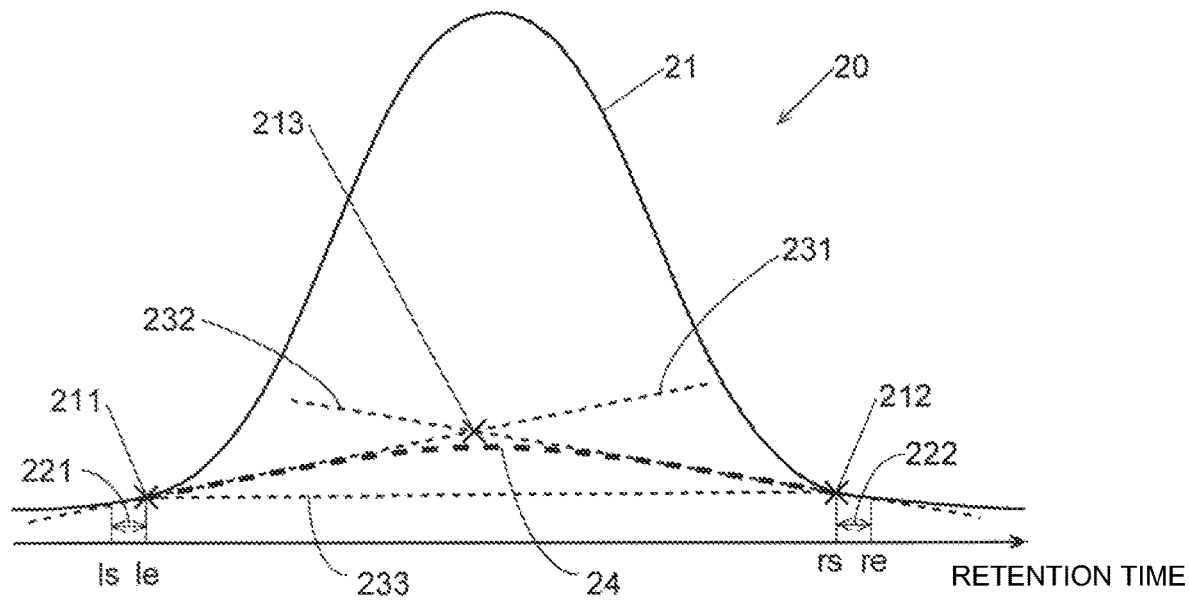
FIG. 3 is a schematic diagram showing control points that include a starting point and an ending point of one of peaks of a chromatogram, and an intermediate control point determined based on the two points, and showing a baseline as a Bezier curve created from the control points.
Figure 4:
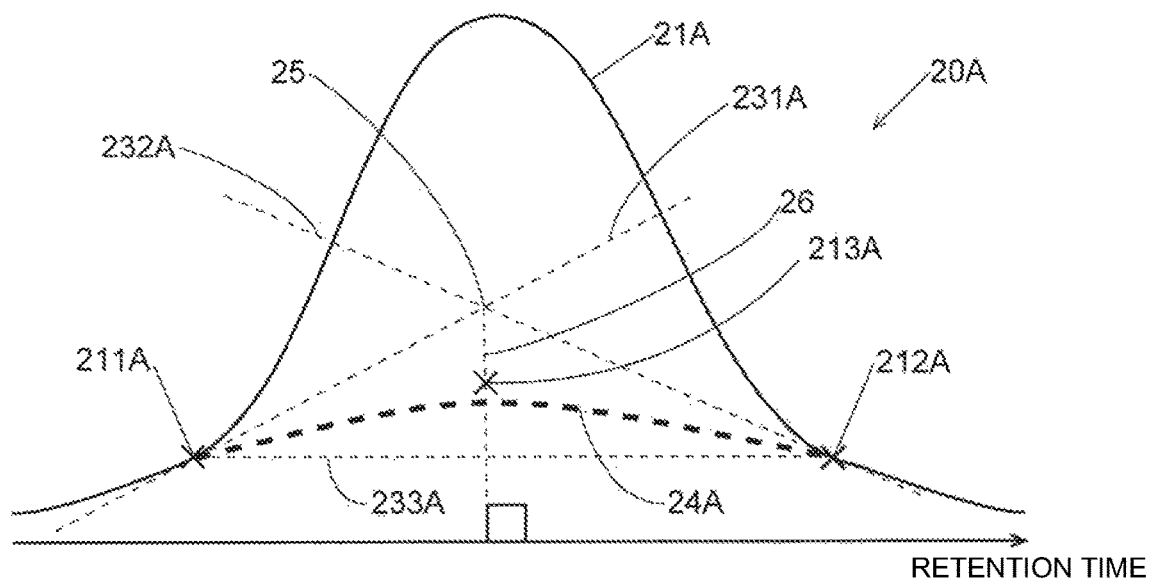
FIG. 4 is a schematic diagram showing another example of a method for determining the intermediate control point.

In step S7, the baseline determiner 14 determines a Bezier curve that has, in order on the parameter axis, the starting point 211 as the first control point, the intermediate control point 213 as the second control point, and the ending point 212 as the third (the last) control point, and determines the Bezier curve to be a partial baseline 24 between the starting point 211 and the ending point 212 (see FIG. 3). Similarly in the example of FIG. 4, a Bezier curve being determined by control points that consist of the starting point 211A, the ending point 212A, and the intermediate control point 213A is determined to be a partial baseline 24A for the section of a peak 21A. The baseline determiner 14 also performs the same operations as described above on sections between the starting points and the ending points of the other peaks. Through the operations described above, the baseline determiner 14 determines the Bezier curve obtained by the above method to be the baseline for the section between the starting point and the ending point of each peak, and determines the curves of the chromatogram to be the baselines for the other sections.

The baseline-subtracted chromatogram creator 15 subtracts the baseline determined by the baseline determiner 14 from the chromatogram to create a baseline-subtracted chromatogram (step S8), and displays the baseline-subtracted chromatogram on the display of the display device 2. Thus, the operation of the data processing method of the present embodiment is finished.

According to the data processing method of the present embodiment, it is possible to determine a baseline to provide a smooth connection at the front and back of the starting point 211 and the ending point 212 of the peak 21.

Next, an example of a specific operation in steps S4, S5, and S7 in the data processing method of the present embodiment will be described with reference to FIG. 5, FIG. 6, and also FIG. 3 described above. Here, a case where the chromatogram has a single peak is described, and accordingly, explanation of step S6 is omitted. However, also when the chromatogram has a plurality of peaks and accordingly, step S6 is performed, the same operation as the following can be applied to each peak.

First, the operations up to step S3 are performed, in step S4-1, the retention time of the starting point of the first range 221 is defined as ls, the retention time of the ending point is defined as le, also the retention time of the starting point of the second range 222 is defined as rs, and the retention time of the ending point is defined as re (see FIG. 3). Here, the starting point 211 of the peak is set as the ending point (retention time le) of the first range 221, and the end point 212 of the peak is set as the starting point (retention time rs) of the second range 222. That is, the first range 221 and the second range 222 are both set outside the peak. At this stage, the retention time ls of the starting point of the first range 221 and the retention time re of the ending point of the second range 222 may be any value.

Then, the value of a natural number n is set to 1 (step S4-2). The value n is set to break operations of the following steps S4-3 to S4-5 when the operations are repeated a predetermined maximum number $n_{max}$ of times.

Subsequently, a regression line is obtained from data of the chromatogram within the first range 221 (between the retention times ls and le) (step S4-3). Then, it is determined whether the residual sum of squares of the regression line and the chromatogram within the first range 221 is equal to or greater than a predetermined threshold value (step S4-4).

If this residual sum of squares is equal to or greater than the predetermined threshold value (YES in step S4-4), the obtained regression line may not be appropriate as the first reference line. In this case, first, in step S4-5, it is checked whether n reaches the maximum number $n_{max}$. If n reaches the maximum number $n_{max}$ (YES in step S4-5), then the process proceeds to step S4-7, and the regression line obtained in step S4-3 is determined to be the first reference line 231. On the other hand, if n does not reach the maximum number $n_{max}$ (NO in step S4-5), then n is incremented by one, the retention time ls of the starting point of the first range 221 is replaced with a value of "le–(le–ls)/2" (step S4-6), and the process returns to step S4-3. The length of the retention time of the first range 221 after the replacement in step S4-6 is half the length before the replacement.

If the residual sum of squares is less than the predetermined threshold value (NO in step S4-4), then the process proceeds to step S4-7 as it is, and the regression line obtained in step S4-3 is determined to be the first reference line 231.

Figure 5:
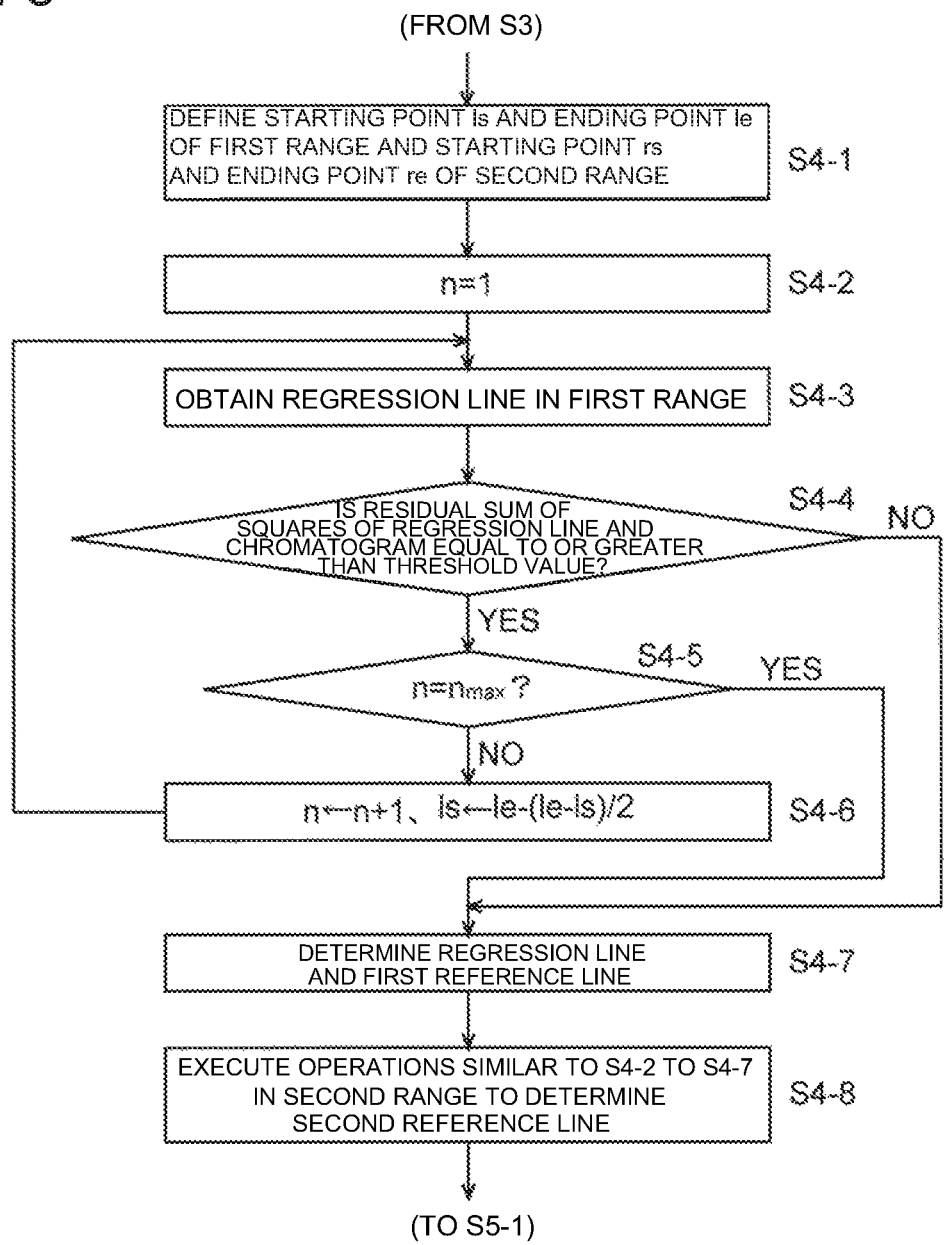
FIG. 5 is a flowchart showing an example of a specific operation in step S4 in one embodiment of a data processing method according to the present invention.

After step S4-7, the same operations as steps S4-2 to S4-7 are performed on the second range 222 (these operations are collectively referred to as step S4-8 in FIG. 5 and their details are omitted) to determine the second reference line 232.

Figure 6:
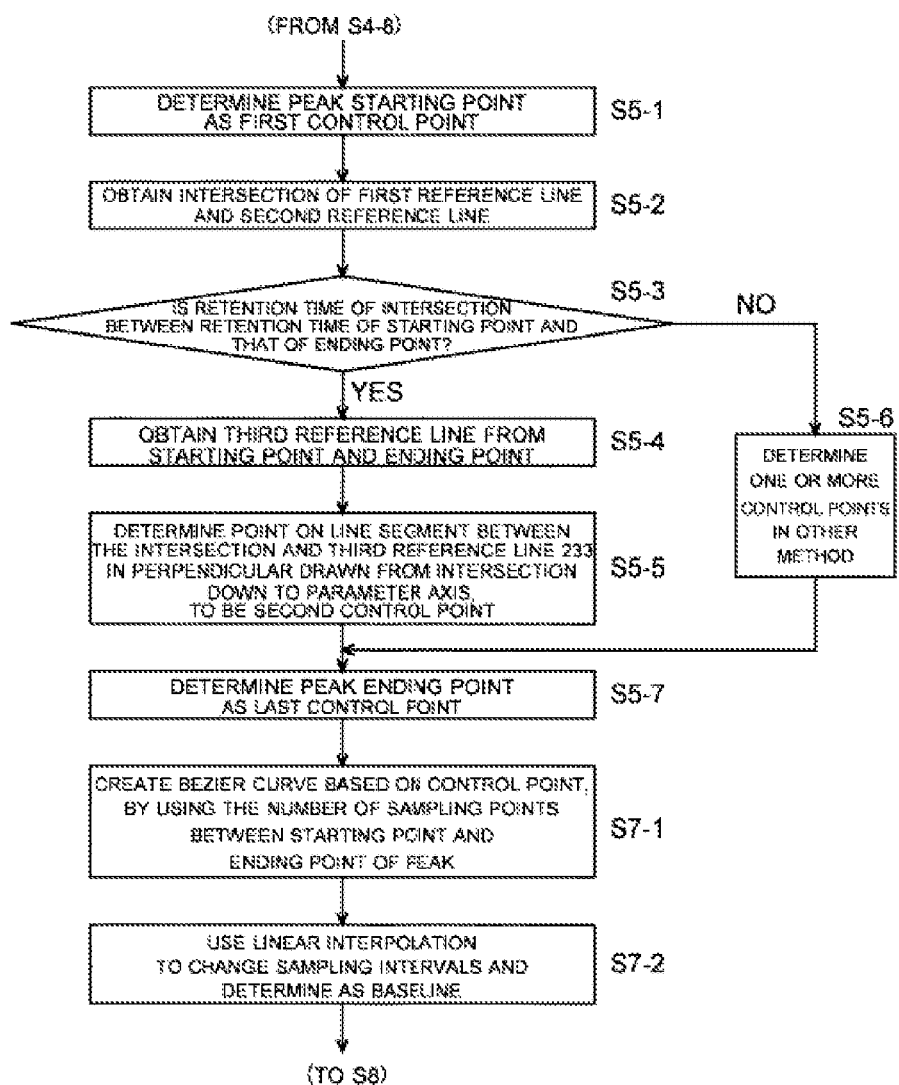
FIG. 6 is a flowchart showing an example of a specific operation in steps S5 and S7 in one embodiment of the data processing method according to the present invention.

After step S4-8, the process proceeds to step S5-1 (FIG. 6). In step S5-1, the starting point 211 of the peak is determined to be the first control point of the Bezier curve. Subsequently, in step S5-2, an intersection of the first reference line 231 and the second reference line 232 is obtained.

Then, in step S5-3, it is determined whether the retention time of the intersection is between the retention time of the starting point 211 and the retention time of the ending point 212. If this determination is YES, in step S5-4, the third reference line 233 connecting the starting point and the ending point of the peak is obtained. Then, in step S5-5, a point (which may be the intersection) that is on a line segment between the intersection and the third reference line 233 in a perpendicular drawn from the intersection down to the parameter axis is determined to be the second control point (the intermediate control point 213).

On the other hand, if the determination in step S5-3 is NO, the intersection is not appropriate to be used to determine the control point, and accordingly, one or more control points are determined by other methods (an example of which will be described later with reference to FIG. 7) in step S5-6.

After step S5-5 or step S5-6, the ending point 212 is determined to be the last control point (step S5-7).

Next, in step S7-1, a Bezier curve is created based on the three (or more) control points obtained in step S5, by using the number of sampling points that is twice the number of sampling points between the starting point and the ending point of the peak (i.e., at half the sampling interval). In step S7-2, the Bezier curve thus created is changed to have the same number of sampling points (same interval) as the chromatogram through linear interpolation, and the resulting Bezier curve is determined to be the baseline. In this way, matching the chromatogram and the baseline in number of sampling points (interval) makes it easy to subtract the baseline from the chromatogram in next step S8. After that, the operation in step S8 is performed as described above, and a series of operations is thus finished.

The present invention is not limited to the above embodiment.

Figure 7:
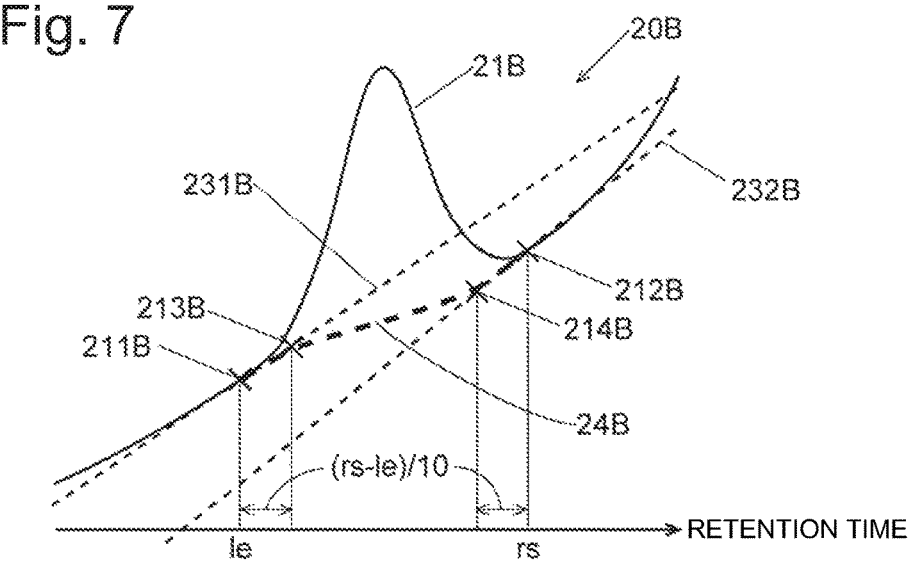
FIG. 7 is a schematic diagram showing another example of a method for determining the intermediate control point.

For example, as shown in FIG. 7, when a peak 21B of a chromatogram 20B is affected by drift, the intersection of a first reference line 231B that is a regression line obtained from data within a predetermined range including a starting point 211B of the peak 21B and a second reference line 232B that is similarly obtained for an ending point 212B of the peak 21B may be far out of the range of the peak. Since it is not appropriate to obtain the intermediate control point based on the intersection that is far out of the range of the peak 21B in this way, instead, any point in a triangle defined by the first reference line 231B to the third reference line (not shown in FIG. 7 for clarity) in vicinity of the starting point 211B is preferably determined to be the intermediate control point. In the example of FIG. 7, a point determined to be a first intermediate control point 213B is on the first reference line 231B at the position shifted from the starting point 211B to the ending point 212B side along the parameter axis by one tenth of the distance (rs–le) between the starting point 211B and the ending point 212B. Since it is not possible to successfully determine a Bezier curve closer to the ending point 212B only using the first intermediate control point 213B, the starting point 211B, and the ending point 212B, in the example of FIG. 7, additionally, a point determined to be a second intermediate control point 214B is on the second reference line 232B at the position shifted from the ending point 212B to the starting point 211B side along the parameter axis by one tenth of the distance (rs−le). Note that the second intermediate control point 214B is not in the triangle. The starting point 211B, the first intermediate control point 213B, the second intermediate control point 214B, and the ending point 212B are used as control points in this order to create a Bezier curve, and it is thus possible to determine the resulting Bezier curve to be a partial baseline 24B for the section of the peak 21B.

Figure 8:
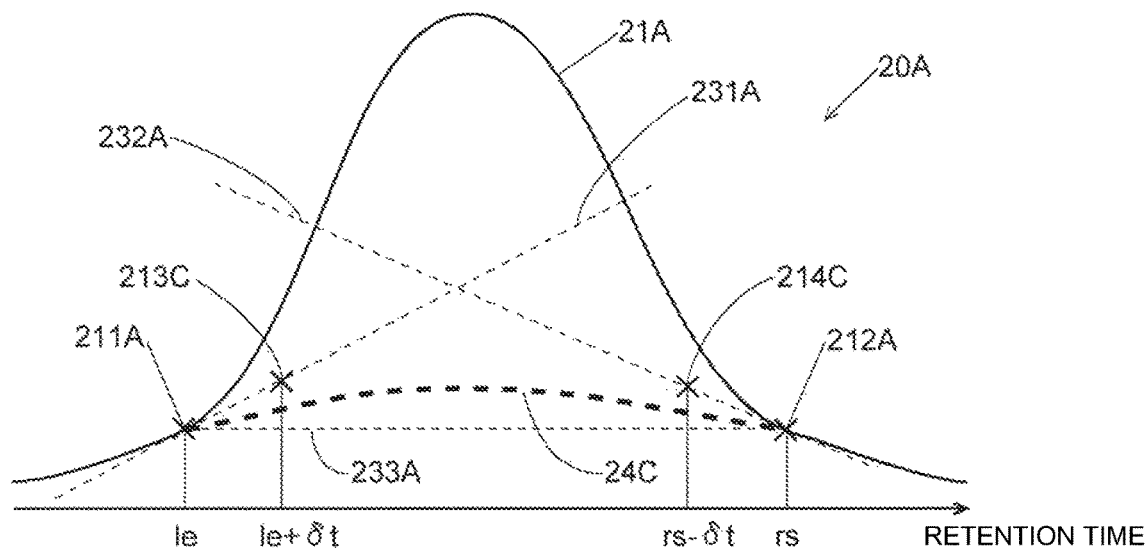
FIG. 8 is a schematic diagram showing another example of a method for determining the intermediate control point.
Figure 9A:
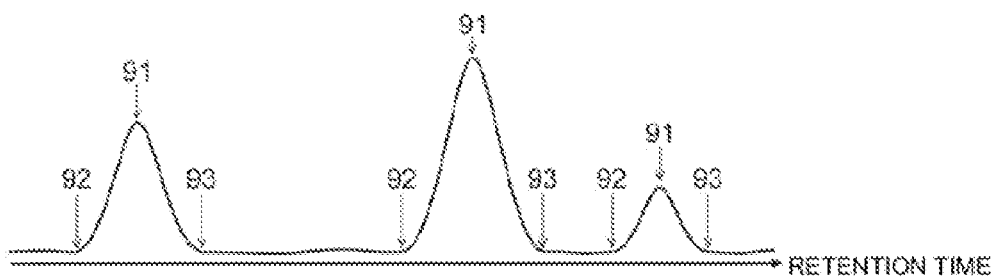
FIGS. 9A-9C are diagrams showing an example of a conventional method for determining a baseline in a chromatogram.
Figure 9B:
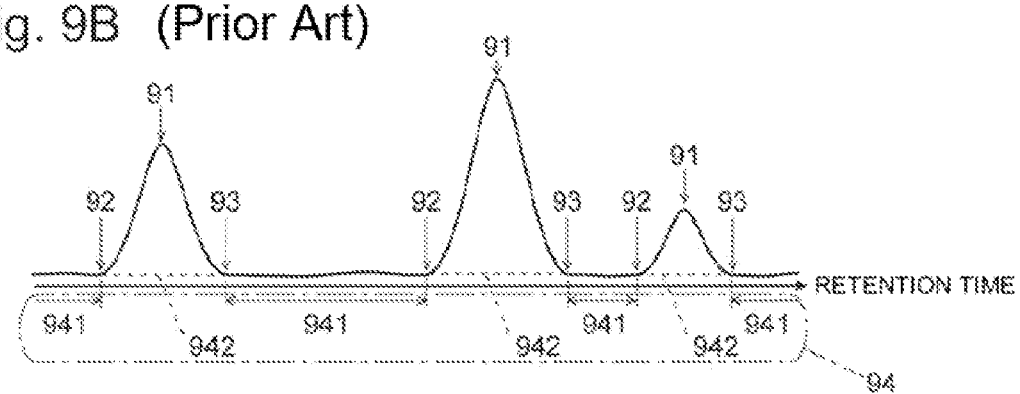
Figure 9C:
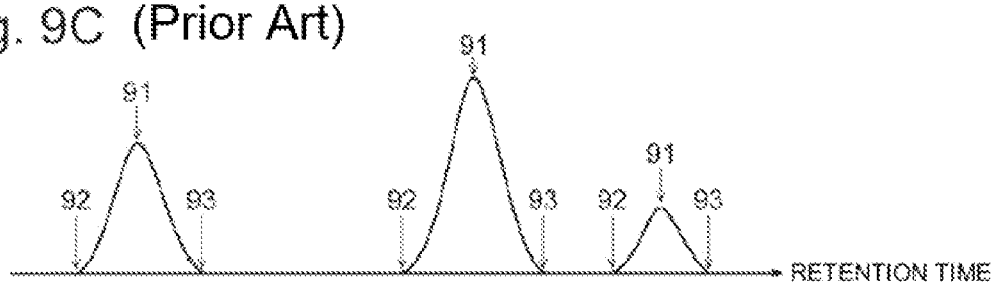

Further, for example, as shown in FIG. 8, two or more intermediate control points may be set in a triangle defined by the first reference line to the third reference line. In the example of FIG. 8, for the peak 21A of the same chromatogram 20A as in FIG. 4, a first intermediate control point 213C is set on the first reference line 231A closer to the ending point 212A by a time δt from the starting point 211A, and a second intermediate control point 214C is set on the second reference line 232A closer to the starting point 211A by a time δt from the ending point 212A. The first intermediate control point 213C and the second intermediate control point 214C are both arranged within (on the sides of) the triangle defined by the first reference line 231A, the second reference line 232A, and the third reference line 233A. Then, the starting point 211A, the first intermediate control point 213C, the second intermediate control point 214C, and the ending point 212A are used as control points in this order to create a Bezier curve, and it is thus possible to determine the resulting Bezier curve to be a partial baseline 24C for the section of the peak 21A. Furthermore, in the example of FIG. 8, one or more intermediate control points may be further provided between the first intermediate control point 213C and the second intermediate control point 214C in the triangle.

REFERENCE SIGNS LIST

1 . . . Data Recording Unit
2 . . . Display Device
3 . . . Input Device
10 . . . Data Processing Device
11 . . . Chromatogram Creator
12 . . . Peak Detector
13 . . . Intermediate Control Point Determiner
14 . . . Baseline Determiner
15 . . . Baseline-subtracted Chromatogram Creator
20, 20A, 20B . . . Chromatogram
21, 21A, 21B . . . Peak
211, 211A, 211B, 92 . . . Starting Point
212, 212A, 212B, 93 . . . Ending Point
213, 213A . . . Intermediate Control Point
213B, 213C . . . First Intermediate Control Point
214B, 214C . . . Second Intermediate Control Point
221 . . . First Range
222 . . . Second Range
231, 231A, 231B . . . First Reference Line
232, 232A, 232B . . . Second Reference Line
233, 233A . . . Third Reference Line
24, 24A, 24B, 24C, 941, 942 . . . Partial Baseline
25 . . . Intersection of First Reference Line and Second Reference Line
26 . . . Perpendicular drawn from Intersection 25 down to Parameter Axis
91 . . . Peak Top

The invention claimed is:

1. A data processing method comprising:
detecting a starting point and an ending point of a peak from data of a chromatogram or a spectrogram, that is obtained from a chromatograph or a spectrometer, showing changes in intensity with respect to a parameter;
determining a first reference line that is a regression line obtained from data within a predetermined range including the starting point of the peak, a second reference line that is a regression line obtained from data within a predetermined range including the ending point of the peak, and a third reference line that is a straight line connecting the starting point of the peak and the ending point of the peak,
determining one or more intermediate control points in a triangle defined by the first reference line, the second reference line and the third reference line;
creating a baseline of the peak by creating a Bezier curve between the starting point of the peak and the ending point of the peak to be the baseline of the peak, the Bezier curve being determined by the starting point of the peak, the one or more intermediate control points of the peak, and the ending point of the peak in order on a parameter axis;
creating a baseline-subtracted chromatogram or spectrogram by removing the baseline from the chromatogram or spectrogram; and
displaying the baseline-subtracted chromatogram or spectrogram on a display for analyzing at least one component of a sample provided in the chromatograph or the spectrometer and said sample is represented in the baseline-subtracted chromatogram or spectrogram.

2. The data processing method according to claim 1, wherein the intermediate control point is an intersection of the first reference line and the second reference line.

3. The data processing method according to claim 1, wherein the intermediate control point is a point that is different from an intersection of the first reference line and the second reference line and has a same value of the parameter as the intersection.

4. A system comprising:
a display; and
a data processing device comprising at least one processor that implements:
a peak detector that detects a starting point and an ending point of a peak from data of a chromatogram or spectrogram, that is obtained from a chromatograph or a spectrometer, showing changes in intensity with respect to a parameter;
an intermediate control point determiner that determines a first reference line that is a regression line obtained from data within a predetermined range including the starting point of the peak, a second reference line that is a regression line obtained from data within a predetermined range including the ending point of the peak, a third reference line that is a straight line connecting the starting point of the peak and the ending point of the peak, and one or more intermediate control points in a triangle defined by the first reference line, the second reference line and the third reference line;
a baseline determiner that creates a baseline of the peak by creating a Bezier curve between the starting point of the peak and the ending point of the peak to be the baseline of the peak, the Bezier curve being determined by the starting point of the peak, the one or more intermediate control points, and the ending point of the peak in order on a parameter axis; and
a baseline-subtracted chromatogram or spectrogram creator that creates a baseline-subtracted chromatogram or spectrogram by removing the baseline from the chromatogram or spectrogram, and that causes the display to display the baseline-subtracted chromatogram or spectrogram for analyzing at least one component of a sample provided in the chromatograph or the spectrometer and said sample is represented in the baseline-subtracted chromatogram or spectrogram.

* * * * *